March 24, 1970     W. M. FINK     3,502,848

SELF-STIRRING COOKER AND SERVER APPARATUS

Filed Nov. 15, 1968     3 Sheets-Sheet 1

INVENTOR.
WILLIAM M. FINK

BY *Drummond & Cahill*

ATTORNEYS

March 24, 1970 W. M. FINK 3,502,848
SELF-STIRRING COOKER AND SERVER APPARATUS
Filed Nov. 15, 1968 3 Sheets-Sheet 2

INVENTOR.
WILLIAM M. FINK
BY
*Drummond & Cahill*
ATTORNEYS

March 24, 1970         W. M. FINK         3,502,848
SELF-STIRRING COOKER AND SERVER APPARATUS
Filed Nov. 15, 1968         3 Sheets-Sheet 3
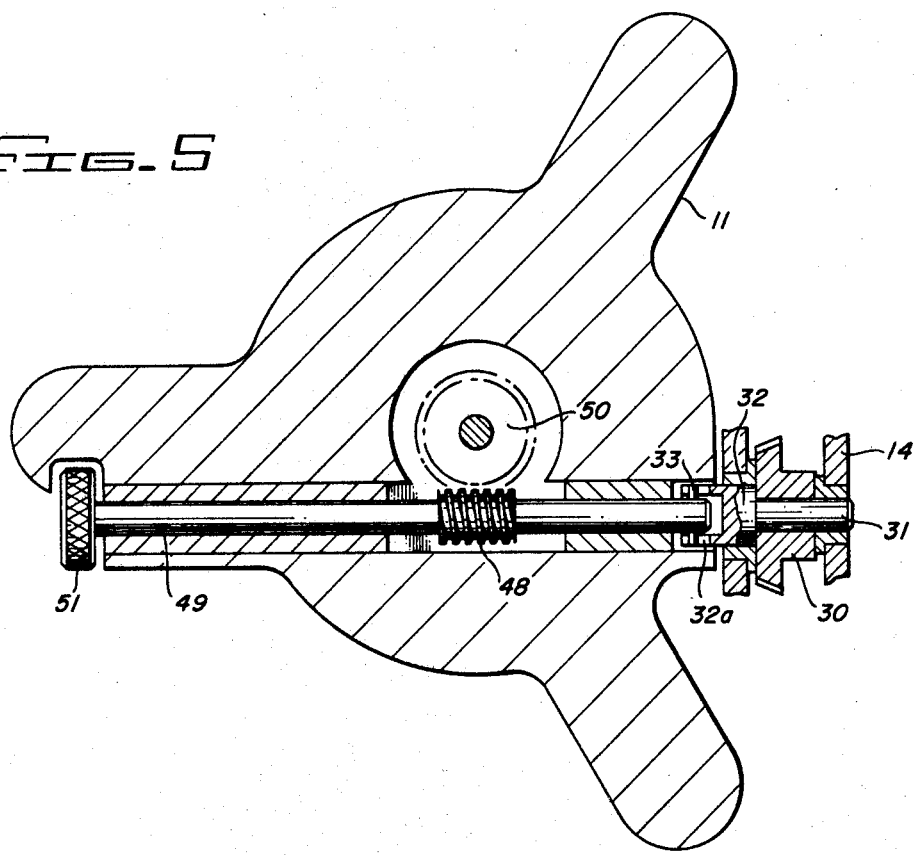
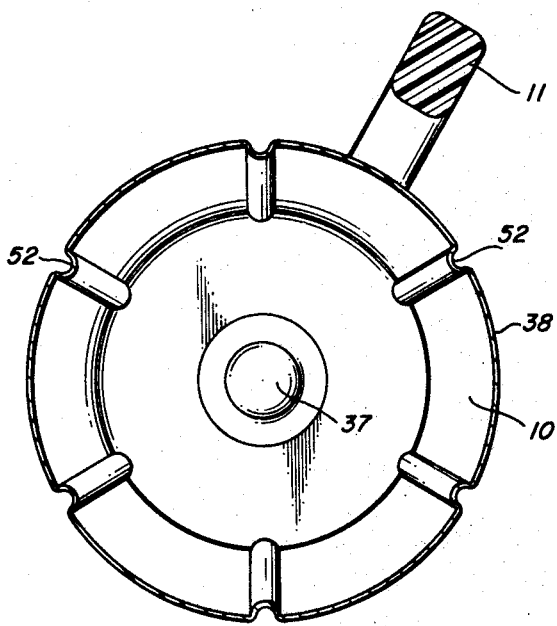
INVENTOR.
WILLIAM M. FINK
BY
ATTORNEYS

United States Patent Office 3,502,848
Patented Mar. 24, 1970

3,502,848
SELF-STIRRING COOKER AND SERVER APPARATUS
William M. Fink, 1202 E. Orchid Lane,
Phoenix, Ariz. 85020
Filed Nov. 15, 1968, Ser. No. 776,033
Int. Cl. F27d 11/02; B01f 9/08
U.S. Cl. 219—432                    1 Claim

ABSTRACT OF THE DISCLOSURE

A combination cooking, stirring and serving apparatus for preparing gravies, soups, and the like, which includes a combination cooking and serving receptacle of circular cross-section, a detachable handle assembly forming a stand for the receptacle during serving and forming a part of the stirring apparatus during cooking, and a cooking-stirring stand which includes heating elements embedded in a concave surface upon which the receptacle rests during cooking, and a motor for rotating the receptacle to stir the contents thereof during cooking.

---

This invention relates to cooking apparatus.

More particularly, the invention relates to an apparatus which simultaneously cooks and stirs food.

In still another aspect, the invention relates to apparatus of the type described which is readily disassemblable and in which the receptacle which holds the food during the cooking operation is separable and may be used conveniently as a serving vessel.

In a still further and more particular aspect, the invention relates to cooking, stirring and serving apparatus of the type described which is especially adapted to the preparation of gravies, stews, sauces, soups and the like, and which is also advantageously employed in prepared popcorn, puddings, pie fillings, sautéed foods and, in fact, in the preparation of any foods, the preparation of which requires heating or stirring, or both.

The prior art has provided a number of devices which are adapted to either cook or stir foods. In general, these devices employ a receptacle for the food and externally actuated stirring mechanisms which are rather complex such as the mechanically actuated stirring device of the Melville patent Re. 24,323 or, in the case of the patent to Hollingsworth, U.S. 2,945,682, the entire container is rotated by a magnetic clutch mechanism. The patent to Merrill, U.S. 3,341,184, discloses a receptacle having internal flutes which assist in agitating liquid contained therewithin under the influence of externally actuated impellers positioned within the receptacle.

To date, the art has not provided a unitary apparatus which is satisfactorily capable of both heating and agitating foods in a receptacle, in which the means for heating the receptacle form an attractive and aesthetically pleasing base member for the device, in which the stirring mechanism is of simplified, easily maintained and cleaned construction, and in which the receptacle is attractively and aesthetically formed to function as a serving vessel and in which the speed of agitation of the contents and the rate of application of heat can be accurately and conveniently controlled.

It would be highly advantageous to provide an apparatus which achieves all of these desired advantages and, yet, which functions positively, in an uncomplicated manner, and which may be easily cleaned after use.

It is therefore an object of the present invention to provide an improved cooking, stirring and serving apparatus.

Still another object of the invention is to provide an apparatus of the type described which can be easily cleaned.

Yet another object of the invention is to provide an apparatus of the type described which is compact and which can be conveniently and accurately controlled to adjust the temperature and degree of agitation to the requirements of the particular food being prepared.

These and other, further and more specific objects and advantages of the invention will become more apparent to those skilled in the art from the following detailed description thereof, taken in conjunction with the drawings, in which.

Figure 1:
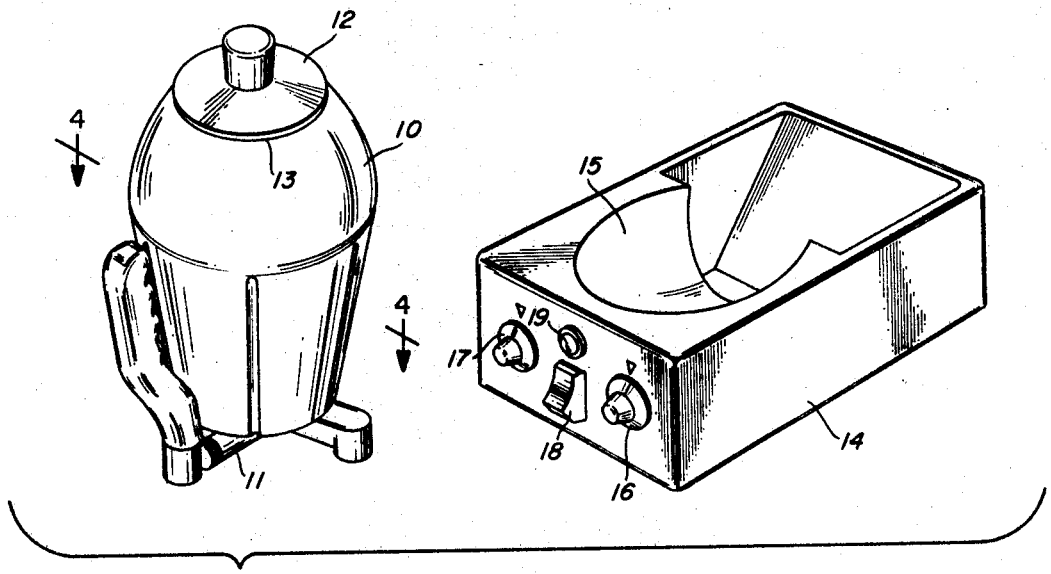
FIG. 1 is a perspective view of the presently preferred embodiment of the invention, illustrating the heating and stirring base, with the food container separated therefrom, ready for use as a serving vessel.
Figure 2:
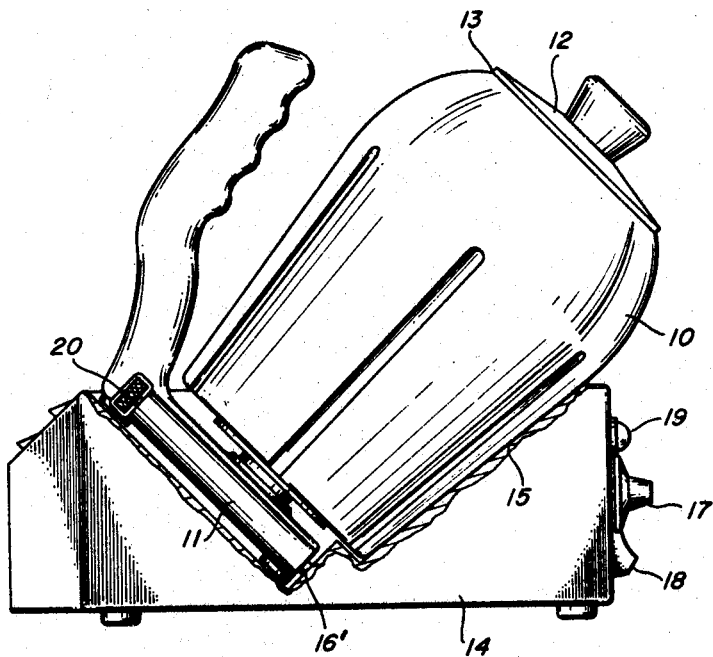
FIG. 2 is a sectional view of the apparatus of FIG. 1 showing the cooking and stirring receptacle positioned upon the base in operative position.
Figure 3:
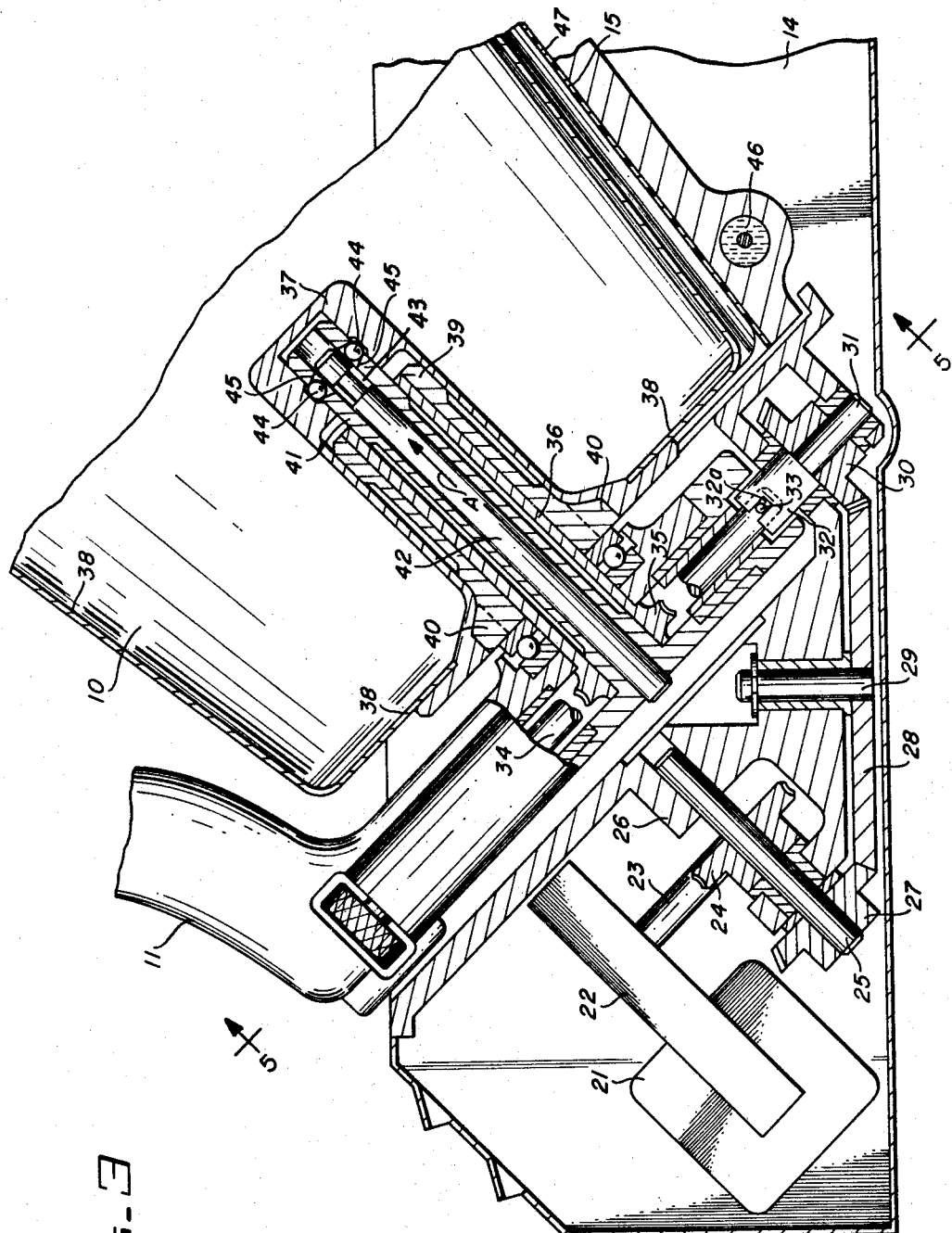
FIG. 3 is a cross-sectional view of the apparatus of FIG. 2.

FIG. 4 is a sectional view of the cooking, stirring and serving receptacle of FIGS. 1 and 2 taken along section line 4—4 of FIG. 1; and FIG. 5 is a sectional view of the handle assembly of the receptacle taken along section line 5—5 of FIG. 3.

Briefly, the invention herein described comprises a combination cooking, stirring and serving apparatus which includes a hollow receptacle, a handle assembly detachably affixed to said receptacle and a cooking-stirring stand subassembly which includes a concave surface adapted to receive and register with the receptacle, electrical heating elements embedded in said concave surface, and an electric motor drive means adapted to rotate the receptacle upon said concave surface.

The receptacle is hollow, has a circular cross section and continuous convex outer surfaces. The inner surfaces of the receptacle are provided with internally projecting stirring ribs extending longitudinally along the inner walls thereof. The upper end of the receptacle is provided with a pouring opening and an elongate hol'ow gland member is formed into the base of the receptacle and extends upwardly inwardly thereof.

The handle assembly includes a handle frame, a handle extending upwardly from the handle frame, a rotatable driving shaft journaled in said handle frame which is shaped and dimensioned for slip-fit driving engagement within the gland member of the receptacle, and worm gear drive means carried by the handle frame for rotating said driving shaft.

The cooking-stirring stand subassembly comprises a frame having a horizontal base, upstanding side members, and a recessed concave upper surface shaped to receive and register with the convex outer surfaces of said receptacle. Electrical heating elements are embedded in the concave surface of the frame and electric motor means are carried within the frame, connected by driving means also carried by the frame, for detachably engaging the handle worm gear.

Turning now to the drawings in which the presently preferred embodiment of the invention chosen for purposes of illustration is depicted, FIG. 1 illustrates the receptacle 10 and associated handle assembly 11 in upright position as the receptacle would be used for serving purposes. A decorative cap 12 covers the pouring opening 13. The cooking-stirring stand assembly 14 includes a recessed concave upper surface 15 shaped to receive and engage the convex outer surfaces of the receptacle 10 and is provided with a speed control 16 which regulates the speed of rotation of the receptacle, a temperature control 17 which regulates the temperature of the contents of the receptacle, an on-off switch 18, and an indicator light 19 which monitors the operation of the heating element.

The subassemblies of FIG. 1 are shown in FIG. 2 in operative position for cooking and stirring the contents of the receptacle. As indicated, the receptacle 10 and its associated handle member assembly 12 rest upon the concave surface 15 in such a manner as to permit a driving connection 16' to be made between the internal motor and gear train contained within the stand 14. A knurled thumbscrew 20 carried by the handle assembly 11 permits one to conveniently engage the driving connection 16 when the receptacle 10 is placed in operative cooking or stirring position, as will be more fully explained in connection with the description of FIGS. 3–5.

FIG. 3 is a cross-sectional view illustrating the elements of the handle assembly and cooking-stirring stand assembled in operative position as shown in FIG. 2. A driving motor 21 transmits power through a speed reduction gear system 22 to a worm drive 23 engaged with a mating ring gear 24 carried by a shaft 25 journaled into the frame 26 and carrying a bevel gear 27 which mates with a corresponding bevel gear 28 supported by a shaft 29 journaled into the frame 26. The bevel gear 28 transmits power to a third bevel gear 30 carried by a shaft 31 journaled into frame 26, which shaft 31 carries a slotted female drive collar 32. The slots 32a of the collar 32 receives a driving pin 33 extending laterally from a worm gear shaft 34 which transmits power to a mating circular gear 35 formed integrally in a collar 36 extending upwardly into the opening formed by the gland member 37 which is fixed to the wall 38 of the receptacle 10. The collar 36 is press-fitted into a bushing 39 provided with outwardly extending key members 40 which, in turn, register and are received into radially extending slots formed in the gland 37. A bearing sleeve 41 extends coaxially concentrically with the collar 36 and the bushing 39 and is provided with an internal channel which receives a finger-actuated plunger member 42 having a detent 43 formed in the upper end thereof. A plurality of balls 44 are circumferentially spaced around the plunger 42 and are held in position by the inwardly sloping sides 45 of apertures in the bearing sleeve 41. Depression of the plunger 42 in the direction of the arrow A allows the balls 44 to drop into the detents 43, whereupon the receptacle 10 and the gland member 37 affixed thereto may be entirely separated from the handle assembly 11. This permits effective cleaning of the receptacle 10 without immersing the mechanism of the handle assembly 11.

Electrical resistance heating elements 46 are embedded in the concave surface 15 of the base 14. A Teflon coating 47 is advantageously applied to the concave surfaces 15 in order to reduce friction between the walls 38 of the container 10 and the concave surface 15 without seriously interferring with the flow of heat from the heating element 46 through the walls of the concave surface 15 of base 14, and through the wall 38 of the receptacle 10.

FIG. 5 illustrates in cross-section the construction of the handle assembly and particularly the drive connection between the cooking-stirring stand and the receptacle. The handle assembly frame 11 serves as a stand for the receptacle during serving operations. A worm gear 48 carried on a shaft 49 rotatably journaled into the handle 11 and drivingly engaged with a mating circular gear 50 is provided with a knurled thumbscrew 51 which permits one to manually adjust the angular position of the driving pin 33 such that it may be readily engaged with the slot 32a of the collar 32 which transmits power in the manner described above from the driving motor 21 in the cooking-stirring stand 14.

FIG. 4 illustrates the presently preferred method of forming the internally projecting stirring ribs 52 in the receptacle 10. As shown, the ribs 52 are formed integrally in the wall 38 of the receptacle 10 by any suitable rolling or molding technique. Alternatively, as will be apparent to those skilled in the art, the receptacle 10 may be formed with smooth outer surfaces and the inwardly projecting ribs may be formed integrally with the walls or formed separately and affixed internally of the receptacle by any suitable method.

As will be apparent from the foregoing description, my invention provides a sanitary and aesthetically pleasing apparatus for performing a wide variety of cooking and stirring operations and also provides convenient and aesthetically acceptable means for serving the cooked materials when preparation has been completed. The device can be used to conduct either stirring or heating operations, or both, and the operations can be conducted concurrently, sequentially, or alternatively in point of time.

Various modifications of the precise details of the preferred embodiment depicted in the drawings for purposes of illustration will readily occur to persons skilled in the art. To the extent that such modifications do not depart from the spirit of the invention, they are intended to be included within the scope thereof which is to be determined only by a just interpretation of the following claim:

I claim:
1. A combination cooking-stirring-serving apparatus comprising:
 (a) a hollow receptacle of circular cross-section and continuous convex outer surfaces, having
  (i) internally projecting stirring ribs extending longitudinally along the wall thereof,
  (ii) a pouring opening in the upper end thereof, and
  (iii) an elongate hollow gland member extending upwardly inwardly from the base thereof;
 (b) a handle assembly detachably affixed to said receptacle comprising
  (i) a handle frame,
  (ii) a handle extending upwardly from said handle frame,
  (iii) a rotatable driving shaft journaled in said handle frame shaped and dimensioned to be detachably slip-fit into driving engagement with said gland member, and
  (iv) worm gear means carried by said handle frame for rotating said driving shaft;
 (c) a cooking-stirring stand assembly comprising:
  (i) a frame having
   a horizontal base,
   upstanding side members, and
   a recessed concave upper surface shaped to register with the convex outer surfaces of said receptacle,
  (ii) electrical heating elements embedded in the concave surface of said frame,
  (iii) electric motor means carried within said frame,
  (iv) driving means carried by said frame for detachably engaging said handle worm gear means, and
  (v) electric motor means carried within said frame for actuating said driving means.

References Cited

UNITED STATES PATENTS

| 1,134,354 | 4/1915 | Seifke | 259—72 X |
| 2,282,866 | 5/1942 | Hagen | 259—108 |
| 2,759,091 | 8/1956 | Kolberg | 219—432 |
| 2,945,682 | 7/1960 | Hollingsworth | 259—81 |
| 3,429,252 | 2/1969 | Colonna | 99—281 |

FOREIGN PATENTS 655,118   1/1963   Canada.

VOLODYMYR Y. MAYEWSKY, Primary Examiner

U.S. Cl. X.R.

99—281; 219—433; 259—81